3,449,209
METHOD OF PREPARING *BRUCELLA ABORTUS* VACCINES

John Cameron, London, England, assignor to Burroughs Wellcome & Co. (U.S.A.) Inc., a corporation of New York
No Drawing. Filed May 25, 1965, Ser. No. 458,768
Claims priority, application Great Britain, May 26, 1964, 21,685/64
Int. Cl. C12k *5/00, 3/00;* A61k *23/00*
U.S. Cl. 195—96　　　　　　　　　　　　　2 Claims

ABSTRACT OF THE DISCLOSURE

A method of preparing vaccines containing living *Brucella abortus* organisms, which comprises the first step of culturing the *Brucella abortus* organism in a nutrient medium containing fructose and the second step of freeze drying the culture prepared in the first step.

---

This invention relates to the preparation of vaccines containing living *Brucella abortus*.

Avirulent strains of *Brucella abortus*, such as strain S. 19, are used in the preparation of a living vaccine against contagious abortion in cattle. These strains may be grown on a solid surface culture or in an aerated liquid culture, containing nutrients and growth factors known to be required for this purpose according to the art. The harvest is usually adjusted so as to constitute a vaccine containing a statutory number of living organisms of *Brucella abortus* per dose. In the case of strain S.19 this number is 60 to $80 \times 10^9$ for Great Britain, but the figure may vary country to country.

Such vaccines in a liquid form suffer from the disadvantage of having a relatively short life even under optimal storage conditions at 0° to 4° C. While a vaccine grown on solid media can be successfully freeze dried giving a product having a satisfactory shelf life, cultures efficiently grown on a large scale in an aerated liquid medium and subsequently freeze dried deteriorate rather rapidly on storage. The efficiency of the growth stage and also the effects of freeze-drying and storage can be indicated by viability counts, which show the number of organisms alive before and after a process or storage.

It has now been found that a preparation of an avirulent strain of *Brucella abortus* with a high viability can be contained by culturing the strain in a nutrient medium containing fructose, as the main carbon source or part of it, and freeze-drying the culture. It has also been found that such a preparation has advantageous keeping properties, as it can be stored at a low temperature for a prolonged period, or at a high temperature, which corresponds to tropical conditions, for a period of several days, without serious loss of viability or deterioration making the vaccine inoperative. Further improvement in keeping properties has been achieved by the addition of sucrose to the medium before freeze-drying.

According to the present invention in one aspect therefore there is provided a method for the preparation of a living *Brucella abortus* vaccine, comprising the steps of cultivating an avirulent *Brucella abortus* strain as a culture in a nutrient medium, which includes or to which is added an adequate amount of a carbon source consisting of fructose or containing fructose in a concentration of at least 0.1% w./v. in the medium or at least 2.5% w./w. in proportion to the carbon source, and freeze-drying the culture. In a particular aspect there is provided a method in which sucrose is added to the culture medium before freeze-drying.

In another aspect there is provided a freeze-dried vaccine, containing a living avirulent *Brucella abortus* strain, which has been grown in a nutrient culture medium using a carbon source consisting of fructose or containing fructose in a concentration of at least 0.1% w./v. or at least 2.5% w./w. in proportion to the carbon source.

Any substance known to act as a source of carbon in a nutrient system for bacteria, particularly for *Brucella* spp., can be used, and can be considered as adequate for the purposes of the present invention if present in a quantity or concentration which is sufficient to secure the multiplication of these organisms in this respect in a culture medium. Such carbon source may entirely consist of fructose, or may contain some fructose together with other sources of carbon. In the latter case fructose may still be the main carbon source, or it may be a minor component in a mixture of two or more substances used for this purpose. Hexoses, in particular glucose and galactose, may, for instance, conveniently be used in association with fructose.

The total concentration of the carbon source may initially be about 4% w./v., which provides a satisfactory growth rate and yield according to experience. Within this, the proportion of fructose may be reduced to about 2.5% w./w. calculated on the total amount of carbon source used, or to a concentration of 0.1% w./v. in the medium, although the improvement in keeping properties becomes less marked when the amount of fructose present is nearer to the minimum. A carbon source consisting of about 25% w./w. fructose and about 75% w./w. glucose has been found convenient for use.

For the purpose of the present invention any growth medium can be used, which contains, in addition to such a carbon source, the usual and necessary nutrients, such as a nitrogen source, inorganic materials, growth factors, oxygen, and carbon dioxide.

To provide the nitrogen source, ammonium salts or protein hydrolysates containing amino acids may advantageously be employed. For example, a casien hydrolysate, or in particular a papain digest of horse muscle have been found suitable. Usually phosphate salts of potassium or sodium are also added into the medium. Vitamins and growth factors may be supplied by the addition of yeast extracts, and the oxygen or carbon dioxide requirement can be provided by contacting the medium with air, or with a gas mixture having the appropriate composition.

The selection and composition of a basal medium suitable for the cultivation a strain of *Brucella abortus* is well within the knowledge of those skilled in the art, therefore the use of any composition incorporating other materials known for this purpose is within the scope of the invention. Any strain of *Brucella abortus*, which has been found to be suitable as an avirulent strain to be incorporated in a vaccine, may be used in a method according to the present invention. As the strain S.19 of *Brucella abortus* has been well established and made obligatory for use in many countries, this particular strain is very suitable for the purposes of the present invention.

Any method of cultivating the organism may be used which is accepted as a practicable method in the art for this purpose and which uses a nutrient medium containing water. A liquid medium is usually prepared by dissolving the components in water, sterilising the solution and transferring the solution aseptically into a culture vessel. At the cultivation stage the temperature is usually kept around 35° C.

As culture vessels, conical shaking flasks shaken on a shaking machine, and, on a larger scale, aluminium or stainless steel tanks have been found satisfactory, but other types of containers may also be used. Tanks are usually aerated from the bottom of the liquid medium. The medium may also be stirred to obtain uniform conditions within the culture. Harvesting may be carried out two or three days after inoculation.

An additional feature of this invention is the discovery that the stabilizing effect of fructose at freeze-drying and storage can be further enhanced by adding also sucrose to the medium before freeze-drying. The additional improvement is particularly apparent, when the culture which contains the organism has been stored at 0° C. to 4° C. for a period of about 7 days before freeze-drying.

Any standard freeze-drying equipment, which is adapted to operate around a pressure of 0.1 mm. Hg, may be suitable for the present purposes. Neither dilution nor concentration by centrifugation before freeze-drying seems to have a detrimental effect on the keeping properties of the product obtained according to the present invention.

The following examples illustrate the invention.

Example 1

The basal medium was prepared by dissolving in water 30 parts protein hydrolysate, (which is a papain digest of horse muscle containing 4.5 g. total nitrogen per litre), 1 part Marmite (trademark), manufactured by Messrs. Marmite Ltd., London, 0.16 part of disodium hydrogen orthophosphate and 4 parts fructose to make 100 parts of a solution after adjusting with orthophosphoric acid to pH 6.4. The solution was heated to 100° C. and sterilised by filtration through a Seitz filter.

The basal medium (12 litres) was aseptically transferred into a fully baffled, aluminium 20 litre-culture vessel, and was seeded with about $10^{12}$ to $10^{13}$ organisms of the S.19 strain of *Brucella abortus*, which had been grown on a 3% glycerol-agar slope.

The culture vessel was kept at 34 to 36° C., and was aerated with sterile air introduced under the stirrer at a rate of about 1 litre air per minute per litre of medium.

After 72 hours the culture was dispersed in 3 ml. volumes in small bottles without or with the addition of a 50% sucrose solution adjusting the content to 5% sucrose. The contents of the bottles were frozen at −40° C., and the bottles were then placed in an Edwards 51P2 model freeze-drier precooled to −40° C. and held at this temperature for 3 to 4 hours. The pressure was then reduced to 1.0 mm. Hg, the refrigeration stopped and the temperature raised to 25° C. over 24 hours. The bottles were then transferred to a secondary vacuum drier, were kept at 0.03 mm. Hg and room temperature over phosphorus pentoxide for 40 hours, and were stoppered while under vacuum.

Samples were then taken and tested for viability, and other samples were stored under various conditions and re-tested. The results of several independent experiments were as follows:

| No. | Fructose (percent) | Added sucrose before freeze-drying, percent | Viability count (×10⁻⁹/ml.) Before drying | After drying | Recovery in viability (percent) |
|---|---|---|---|---|---|
| 1 | 4 | Nil | 194 | 129 | 66 |
| 2 | 4 | Nil | 204 | 125 | 61 |
| 3 | 4 | 5 | 175 | 132 | 75 |
| 4 | 4 | 5 | 171 | 169 | 100 |
| 5 | 4 | 5 | 197 | 207 | 105 |
| 6 | 4 | 5 | 197 | 145 | 74 |
| 7 | 4 | 5 | 226 | 169 | 75 |
| 8 | 4 | 5 | 200 | 221 | 110 |

Keeping properties:

| No. | Duration (days) | Temp. (° C.) | Recovery in viability (percent) |
|---|---|---|---|
| 1 | 7 | 35 | 86 |
|   | 28 | 35 | 64 |
|   | 7 | 35 | 89 |
|   | 28 | 35 | 48 |
| 2 | 7 | 35 | 69 |
| 3 | 7 | 35 | 98 |
|   | 28 | 35 | 80 |
| 6 | 7 | 35 | 78 |
| 7 | 7 | 35 | 76 |

NOTE.—The accuracy of these measurements is within ±20%.

Example 2

To 25 ml. aliquots of the basal medium described in Example 1, a seed containing about $10^9$ to $10^{10}$ organisms of the S.19 strain of *Brucella abortus* was aseptically added in 250 ml.-conical shaking flasks closed with non-adsorbent cotton-wool plugs.

The flasks were then shaken on a reciprocating shaker with a throw of 3.3 cm. at a rate of about 488 shakes per minute. After 64 hours the contents of the flasks were bulked and were dispensed in 2 ml. volumes in small bottles as described in Example 1. Freeze drying and tests were carried out as in Example 1.

The results of independent experiments were as follows:

| No. | Fructose (percent) | Added sucrose before freeze-drying, percent | Viability count (×10⁻⁹/ml.) Before drying | After drying | Recovery in viability (percent) |
|---|---|---|---|---|---|
| 9 | 4 | 5 | 60 | 57 | 111 |
| 10 | 4 | 5 | 139 | 115 | 83 |
| 11 | 4 | 5 | 169 | 168 | 100 |

Keeping properties:

| No. | Duration (days) | Temp. (° C.) | Recovery in viability (percent) |
|---|---|---|---|
| 9 | 441 | 0 to 4 | 67 |
| 10 | 7 | 35 | 114 |
| 11 | 427 | 0 to 4 | 93 |

Example 3

In order to show the effect of the total absence of fructose, experiments were carried out according to the method described in Example 2, the alternation being the complete replacement of fructose with 3% glucose as a carbon source. No sucrose was added before freeze drying in these experiments.

The results were as follows:

| No. | Viability count (×10⁻⁹/ml.) Before drying | After drying | Recovery (percent) | Keeping properties Duration (days) | Temp. (° C.) | Recovery (percent) |
|---|---|---|---|---|---|---|
| 12 | 314 | 70 | | | | |
| 13 | 158 | 86 | | | | |
| 14 | 475 | 69 | | | | |
| 15 | 1,080 | 122 | | 7 | 35 | <1 |
| 16 | 1,250 | 95 | | 7 | 35 | 3 |
| 17 | 570 | 119 | | 7 | 35 | 8 |
| 18 | 330 | 33 | | 7 | 35 | 7 |
| 19 | 111 | 18 | | | | |
| 20 | 297 | 32 | | 7 | 35 | 1 |
| 21 | 893 | 153 | | | | |
| 22 | 745 | 48 | | | | |

Example 4

Experiments were carried out according to the method described in Example 2, the alteration being the use of a different and complex carbon source.

The results were as follows:

| | Carbon source | | | Growth and freeze drying | | | Keeping properties | | |
|---|---|---|---|---|---|---|---|---|---|
| | | | Sucrose added | Viability count (×10⁻⁹/ml.) | | | | | |
| No. | Fructose (percent) | Glucose (percent) | before freeze-drying(percent) | Before drying | After drying | Recovery (percent) | Duration (days) | Temp. (° C.) | Recovery (percent) |
| 23 | 3 | | | 2,280 | 1,740 | 76 | 7 | 35 | 76 |
| 24 | 3 | | | 2,219 | 1,615 | 73 | 7 | 35 | 55 |
| 25 | 3 | | 5 | 139 | 115 | 83 | 7 | 35 | 115 |
| 26 | 4 | | | 136 | 119 | 88 | 7 | 35 | 78 |
| | | | | 143 | 117 | 82 | 7 | 35 | 90 |
| 27 | 2 | 2 | | 139 | 126 | 91 | 7 | 35 | 100 |
| | | | | 170 | 103 | 60 | 7 | 35 | 67 |
| 28 | 1 | 3 | | 120 | 72 | 60 | 7 | 35 | 100 |
| | | | | 131 | 86 | 66 | 7 | 35 | 74 |
| 29 | 0.5 | 3.5 | | 131 | 79 | 60 | 7 | 35 | 100 |
| | | | | 136 | 123 | 90 | 7 | 35 | 50 |

In these and other results presented in the previous examples viability counts are the arithmatical means of four measurements derived from two parallel experiments in each case. Further experiments showed no significant improvement below 0.1% w./v. fructose or below 2.5% w./w. fructose in proportion to the carbon source.

I claim:

1. In a method of preparing vaccines of living *Brucella abortus* Strain 19 organisms comprising cultivating avirulent *Brucella abortus* Strain 19 organisms in a liquid nutrient medium, the improvement characterized in that fructose is added in a concentration of at least about 0.1% w./v. to the nutrient medium to prepare a culture and thereafter freeze drying the culture.

2. In a method according to claim 1 wherein the nutrient medium includes a carbon source known to act as a source of carbon in a nutrient system for bacteria, the improvement characterized in that the fructose is at least about 2.5% w./v. in proportion to the carbon source.

References Cited

UNITED STATES PATENTS 2,700,611  1/1955  Jeffreys _____ 167—78.5 X
3,184,384  5/1965  Whalen.

OTHER REFERENCES

Alexander et al.: South African Journal of Science, vol. 52, pp. 216–219, April, 1956.

RICHARD L. HUFF, *Primary Examiner.*

U.S. Cl. X.R.

424—92